United States Patent
Lee et al.

(10) Patent No.: US 6,556,753 B2
(45) Date of Patent: Apr. 29, 2003

(54) METHOD FOR THE MANUFACTURE OF A FIBER PACKAGE INCORPORATING THEREIN DISPERSION COMPENSATING GRATINGS

(75) Inventors: Young Tark Lee, Daejeon (KR); Tae Sang Park, Daejeon (KR); Ki Tae Jeong, Daejeon (KR); Han Kyo Seo, Daejeon (KR); Jeong U Jeon, Daejeon (KR); Seok Bong Ko, Daejeon (KR)

(73) Assignee: Korea Telecom, Gyeonggi-Do (KR)

( * ) Notice: Subject to any disclaimer, the term of this patent is extended or adjusted under 35 U.S.C. 154(b) by 208 days.

(21) Appl. No.: 09/735,998

(22) Filed: Dec. 14, 2000

(65) Prior Publication Data
US 2002/0041745 A1 Apr. 11, 2002

(30) Foreign Application Priority Data
Oct. 11, 2000 (KR) .......................................... 2000-59784

(51) Int. Cl.⁷ .................................................. G02B 6/44
(52) U.S. Cl. ...................................................... 385/114
(58) Field of Search ................................. 385/114, 115, 385/126, 128, 24, 37

(56) References Cited

U.S. PATENT DOCUMENTS 5,719,975 A * 2/1998 Wolfson et al. ................ 385/48
6,222,973 B1 * 4/2001 Starodubov ................. 385/128

* cited by examiner

*Primary Examiner*—Lynn D. Feild
*Assistant Examiner*—Son V. Nguyen
(74) *Attorney, Agent, or Firm*—Pennie & Edmonds LLP

(57) ABSTRACT

A method for manufacturing a fiber package for use in an optical communication device, is comprised the steps of: preparing a ribbon-type fiber stack having a pair of sheared sides, the ribbon-type fiber stack being provided with a plurality of fragmental optical fibers, each of fragmental optical fibers including a core surrounded by a cladding; partially peeling the claddings from the fragmental optical fibers to expose the cores; forming gratings into the exposed cores; and installing a pair of side connections on the pair of sheared sides in the ribbon-type fiber stack, thereby forming a fiber package. In the invention method, the ribbon-type fiber stack and a pair of side connections are utilized, which can remove a need for the step of packing the optical fiber(s), simplifying the formation of the fiber stack.

9 Claims, 5 Drawing Sheets

METHOD FOR THE MANUFACTURE OF A FIBER PACKAGE INCORPORATING THEREIN DISPERSION COMPENSATING GRATINGS

FIELD OF THE INVENTION

The present invention relates to a method for manufacturing an optical fiber(s) incorporating therein dispersion compensating gratings for use in an optical communication device; more particularly, to a method for manufacturing a fiber package incorporating therein dispersion compensating gratings using a ribbon-type fiber stack.

BACKGROUND OF THE INVENTION

"Dispersion" hereafter will refer to chromatic dispersion of a transmission medium, e.g., an optical fiber(s). The chromatic dispersion occurs in the transmission medium if the speed of light in the medium depends on the wavelength of the light. Depending on the sign of the pulse of light, dispersion will either lengthen or shorten the time duration of the pulse.

Data transmission through the transmission medium is generally limited by the dispersion. The dispersion shown in FIG. 1 is prominently generated in a long-distance and high-speed transmission and, therefore, is regarded as one of critical problems in the light communication.

For compensating the dispersion, the optical transmission medium is used as either an optical waveguide in which the reflection indexes of core and cladding incorporated therein are controlled or an optical fiber including dispersion compensating gratings. Especially, the optical fiber having dispersion compensating gratings is expected to be more useful and advantageous in terms of its performance.

FIG. 2 is a cross sectional view of a conventional optical fiber 20 having dispersion compensating gratings 23, wherein the gratings 23 are incorporated in a core 21 surrounded by a cladding 22.

In optical communication of Wavelength Division Multiplexing (WDM), various wavelengths are transmitted en masse, wherein each of the wavelengths is involved in one or more signal transmission channels.

For compensating the pulse dispersion, WDM utilizes either an optical fiber including various gratings or a number of optical fibers each having a corresponding grating. Thereafter, the optical fiber(s) having the grating(s) is(are) installed and connected to various optical communication devices.

Prior to the installation of such optical fibers in the optical communication devices, the optical fiber(s) is generally packed into a fiber package for adjusting it to a size required by the optical communication devices. However, the formation of the fiber package is very difficult because the optical fiber is very thin and fragile.

FIG. 3 is a perspective view illustrating a ribbon-type fiber stack 30 incorporated in a ribbon-type optical cable previously disclosed. Typically, a ribbon-type fiber stack 30 includes eight or sixteen optical fibers 32. Accordingly, the ribbon-type fiber stack 30 may be useful in handling and packing a plurality of optical fibers 32.

SUMMARY OF THE INVENTION

It is, therefore, an object of the present invention to provide a method for manufacturing a fiber package incorporating therein dispersion compensating gratings for use in an optical communication device.

In accordance with the present invention, there is provided a method for manufacturing a fiber package for use in an optical communication device, comprising the steps of: preparing a ribbon-type fiber stack having a pair of sheared sides, the ribbon-type fiber stack being provided with a plurality of fragmental optical fibers, each of fragmental optical fibers including a core surrounded by a cladding; partially peeling the claddings from the fragmental optical fibers to expose the cores; forming gratings into the exposed cores; and installing a pair of side connections on the pair of sheared sides in the ribbon-type fiber stack, thereby forming a fiber package.

BRIEF DESCRIPTION OF THE INVENTION

The above and other objects and features of the present invention will become apparent from the following description of preferred embodiments given in conjunction with the accompanying drawings, in which:

FIG. 1 explains "dispersion" generated through an optical fiber in data transmission.

Figure 1:
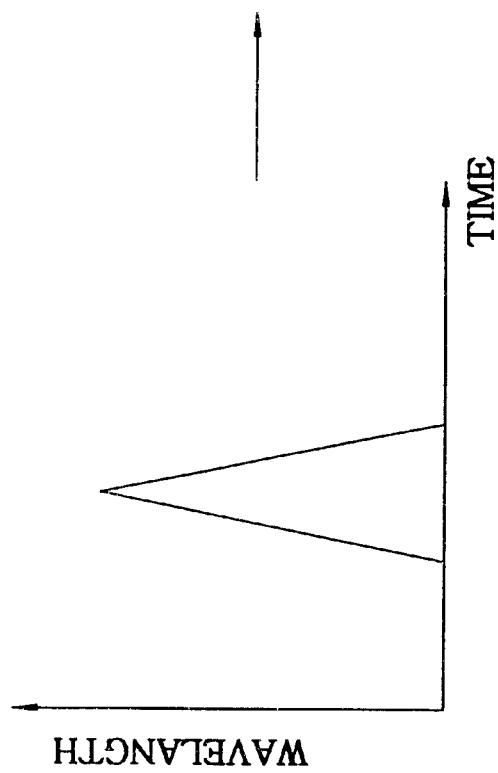
Figure 1:
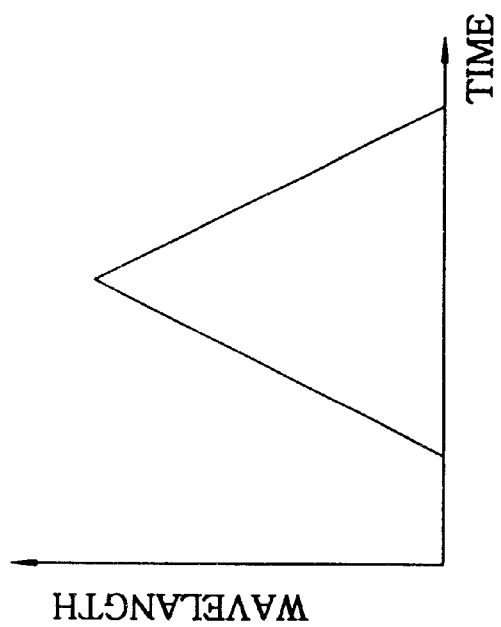
Figure 2:
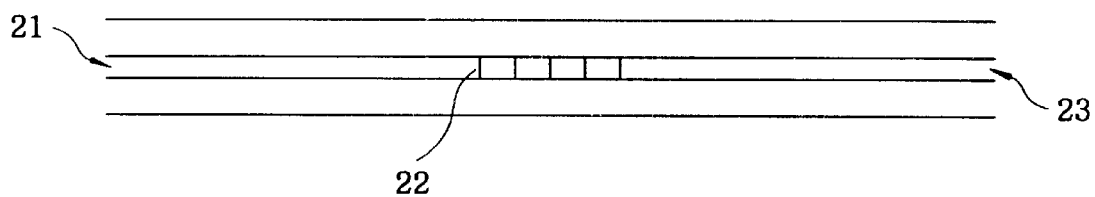
FIG. 2 is a cross sectional view of a conventional optical fiber having a dispersion compensating grating(s)
Figure 3:
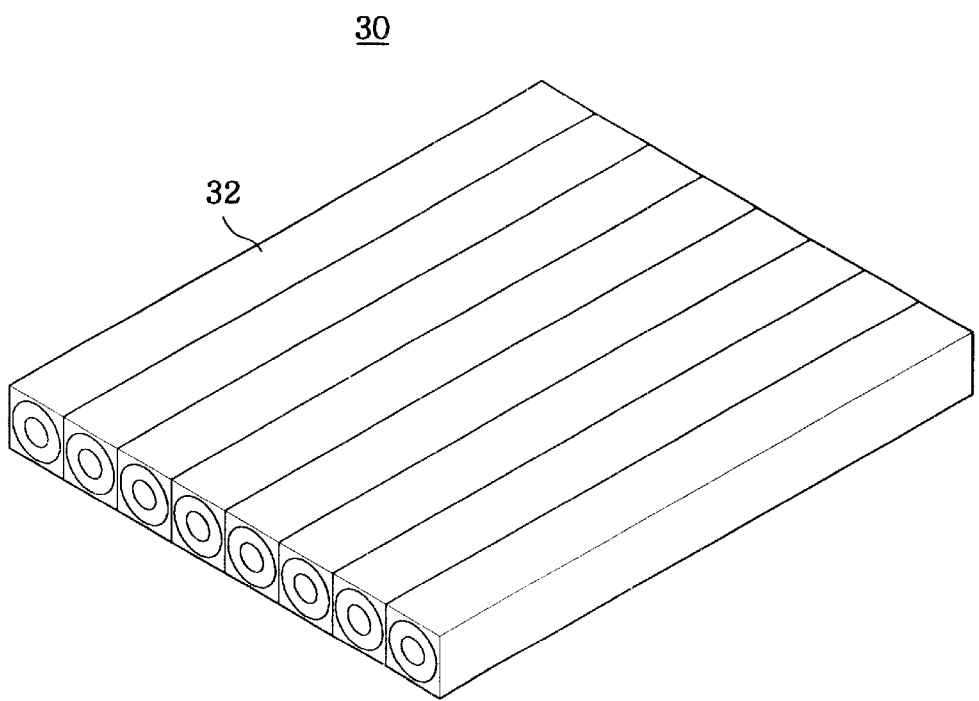
FIG. 3 represents a perspective view setting forth a ribbon-typed fiber stack previously disclosed.
Figure 4:
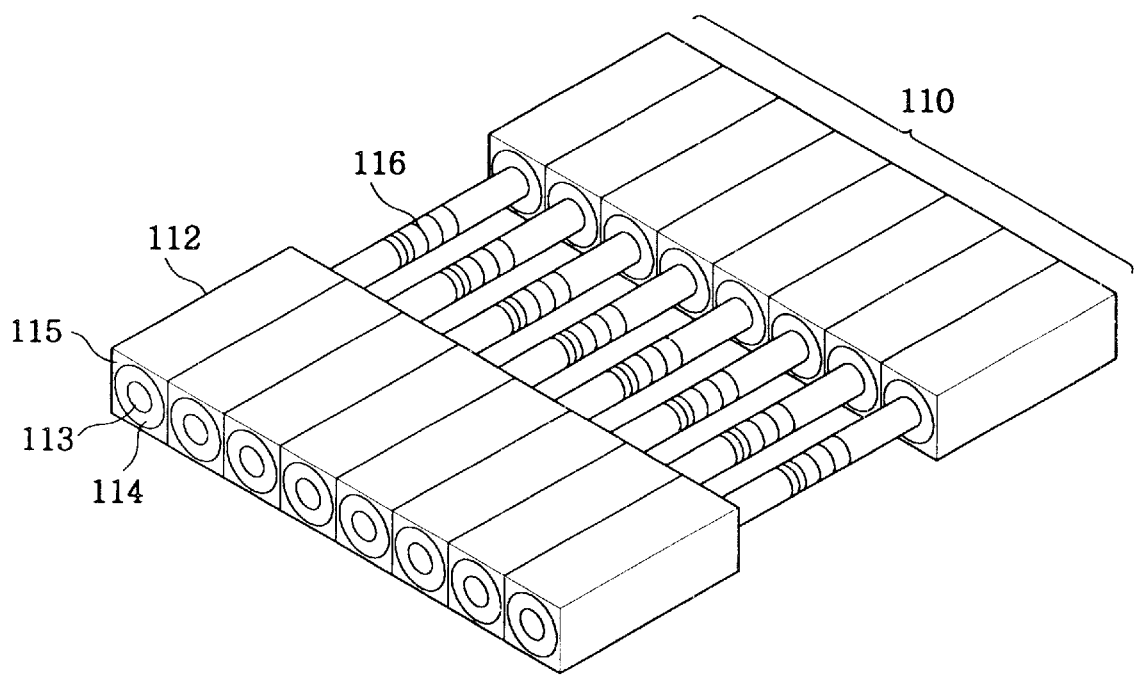
Figure 5A:
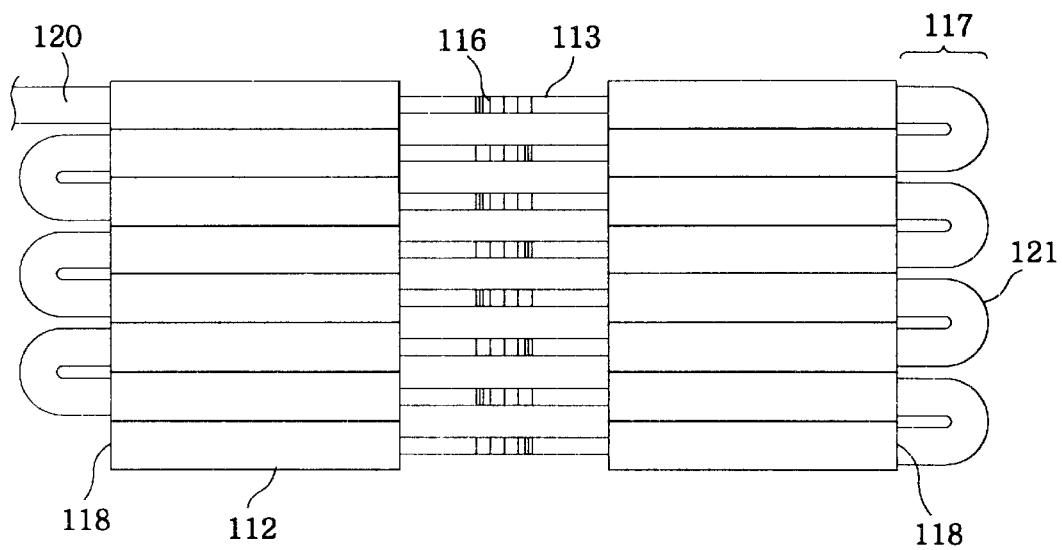
Figure 5B:
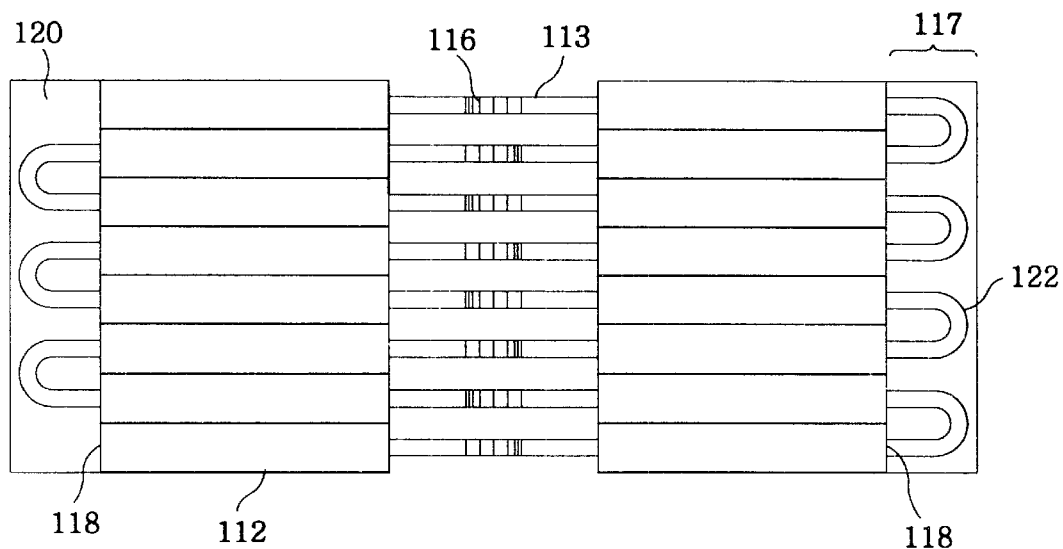
Figure 5C:
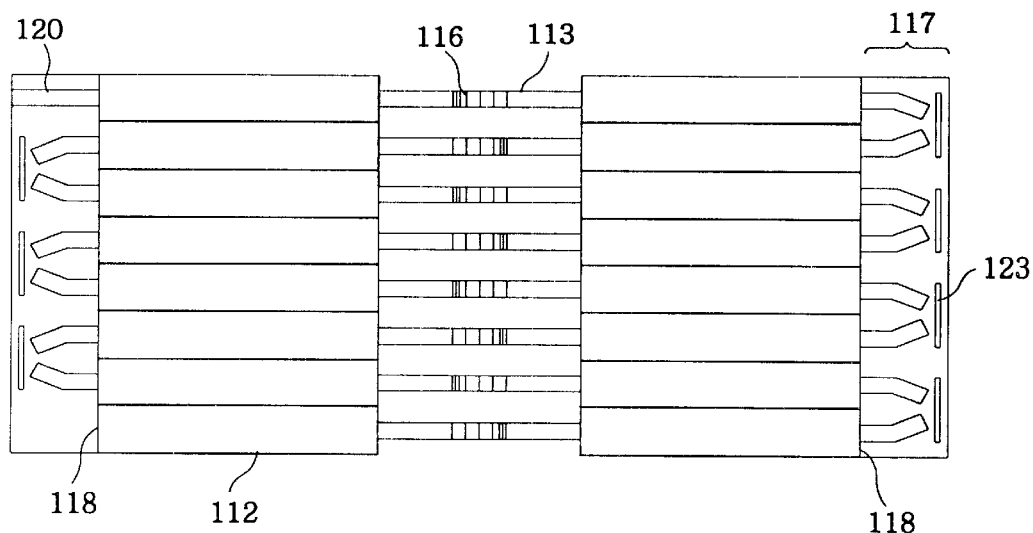
Figure 6:
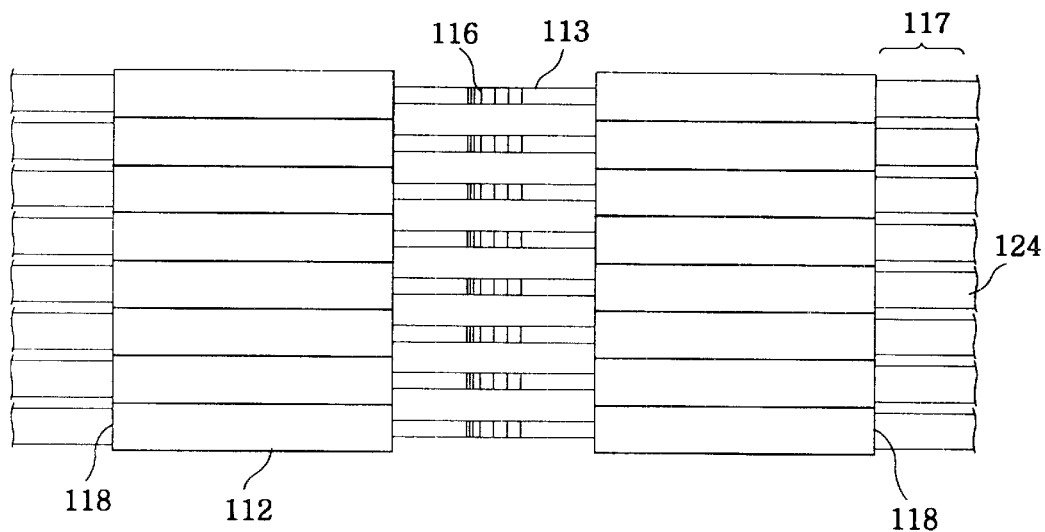

FIG. 4 provides a perspective view illustrating a ribbon-type fiber stack manufactured by a method in accordance with the present invention;

FIGS. 5A to 5C provide top views depicting fiber packages in accordance with three embodiments of the present invention, respectively; and FIG. 6 offers a top view delineating another fiber package in accordance with one embodiment of the present invention.

DETAILED DESCRIPTION OF THE PREFERRED EMBODIMENTS

FIG. 4 provides a perspective view illustrating a ribbon-type fiber stack 110 manufactured by a method in accordance with the present invention.

The method for manufacturing a fiber package 100 begins with a preparation of a ribbon-type fiber stack 110. The ribbon-type fiber stack 110 comprises a pair of sheared sides 118 and a number of fragmental optical fibers 112. Each of the fragmental optical fibers 112 includes a core 113, a cladding 114 surrounding the core 113 and a cortical coating 115 covering the cladding 114.

Thereafter, each of the fragmental optical fibers 112 is partially peeled off by partially removing the cortical coatings 115 and the claddings 114 to expose each of the cores 113.

The ribbon-type fiber stack 110 further comprises a number of dispersion compensating gratings 116 which are formed into the exposed cores 113 of the fragmental optical fibers 112, wherein each of the fragmental optical fibers 112 includes at least a dispersion compensating grating 116.

Then, as shown in FIGS. 5A to 5C and 6, a pair of side connections 117 are installed on the pair of sheared sides 118 in the ribbon-type fiber stack 110, respectively, thereby forming a fiber package 100, wherein the fiber package 100 can function as either one or a number of optical fibers having dispersion compensating gratings 116 depending on a type of the pair of side connections 117, detail for which is described hereafter.

As shown in FIGS. 5A to 5C, if all of wavelengths are transmitted through an optical fiber, the pair of side connections 117 will be structured to connect each of the fragmental optical fibers 112 to neighboring fragmental optical fibers 112, wherein one of the side connections 117 includes an optical terminal 120 through which all of wavelengths are inputted to the fiber package 100. In FIG. 5A, a number of hemicyclic optical fibers 121 are utilized as the pair of side connections 117 in the connection between the fragmental optical fibers 112. In FIGS. 5B and 5C, the pair of side connections 117 pre-fabricated incorporate therein either hemicyclic waveguides 122 shown in FIG. 5B or reflecting mirrors 123 shown in FIG. 5C, wherein the hemicyclic waveguides 122 and the reflecting mirrors 123 are structured with predetermined size and period such that each of the fragmental optical fibers 112 is optically connected to neighboring fragmental optical fibers 112.

Otherwise, if each of wavelengths is transmitted through a corresponding optical fiber, a pair of sets of linear optical fibers 124 are utilized as the pair of side connections 117. The linear optical fibers in the set 124 are connected to the fragmental optical fibers 112 by one to one, as shown in FIG. 6.

Finally, after the exposed cores 113 are covered with a protection material, the fiber package 100 having the gratings will be installed and connected to various optical communication devices.

In contrast with the method for manufacturing the fiber package previously disclosed, in the invention method the ribbon-type fiber stack and the pair of side connections are utilized, which can eliminate a need for the step of packing the optical fiber(s), making the formation of the fiber package be more simple.

While the present invention has been shown and described with respect to the particular embodiments, it will be apparent to those skilled in the art that many changes and modifications may be made without departing from the spirit and scope of the invention defined in the appended claims.

What is claim is:

1. A method for manufacturing a fiber package for use in an optical communication, comprising the steps of:

preparing a ribbon-type fiber stack having a pair of sheared sides, the ribbon-type fiber stack being provided with a plurality of fragmental optical fibers, each of fragmental optical fibers including a core surrounded by a cladding;

partially peeling the claddings from the fragmental optical fibers to expose the cores;

forming gratings into the exposed cores; and installing a pair of side connections on the pair of sheared sides of the ribbon-type fiber stack, thereby forming the fiber package.

2. The method of claim 1, wherein the pair of side connections connect each of the fragmental optical fibers to one or two neighboring fragmental optical fibers.

3. The method of claim 2, wherein one of the side connections includes an optical terminal through which all of wavelengths are inputted to the fiber package.

4. The method of claim 3, wherein each of the side connections is incorporated with a number of hemicyclic optical fibers.

5. The method of claim 3, wherein each of the side connections is prefabricated to incorporate therein a number of hemicyclic waveguides.

6. The method of claim 3, wherein each of the side connections is prefabricated to incorporate therein reflecting mirrors.

7. The method of claim 1, wherein each of the side connections is made of a set of linear optical fibers, the linear optical fibers in the set being connected to the fragmental optical fibers 112 by one to one.

8. An optical fiber package incorporating therein dispersion compensating gratings manufactured according to the method of claim 1.

9. An optical communication device including the fiber package manufactured according to the method of claim 1.

* * * * *